US009951641B2

(12) United States Patent
Copple et al.

(10) Patent No.: US 9,951,641 B2
(45) Date of Patent: Apr. 24, 2018

(54) RESIN TRANSFER MOLDING PROCESS

(71) Applicant: CTL Aerospace, Inc., Cincinnati, OH (US)

(72) Inventors: Simeon Copple, West Chester, OH (US); Nathan Sizemore, Hamilton, OH (US); Tyler Weber, Dayton, OH (US); Joseph Fackey, Cincinnati, OH (US)

(73) Assignee: CTL Aerospace, Inc., Cincinnati, OH (US)

( * ) Notice: Subject to any disclaimer, the term of this patent is extended or adjusted under 35 U.S.C. 154(b) by 0 days.

(21) Appl. No.: 15/209,886

(22) Filed: Jul. 14, 2016

(65) Prior Publication Data

US 2017/0015031 A1    Jan. 19, 2017

Related U.S. Application Data

(60) Provisional application No. 62/192,368, filed on Jul. 14, 2015.

(51) Int. Cl.
| | |
|---|---|
| *F01D 25/24* | (2006.01) |
| *B32B 3/12* | (2006.01) |
| *F01D 11/12* | (2006.01) |
| *B29C 70/48* | (2006.01) |
| *B29C 33/30* | (2006.01) |

(Continued)

(52) U.S. Cl.
CPC .......... *F01D 11/12* (2013.01); *B29C 33/304* (2013.01); *B29C 70/48* (2013.01); *F01D 5/282* (2013.01); *F01D 11/005* (2013.01); *B29C 45/36* (2013.01); *B29C 2945/76498* (2013.01); *B29C 2945/76545* (2013.01); *B29K 2063/00* (2013.01); *B29K 2705/02* (2013.01); *B29L 2007/008* (2013.01);

(Continued)

(58) Field of Classification Search
CPC ......... B29C 45/14; B29C 45/02; B29C 45/77; B29C 45/40; B29C 45/36; B29C 2945/76545; B29C 2945/76498; B29C 45/14065; F01D 11/12; B29L 2007/008; B29L 2031/7504; B29K 2705/02; B29K 2063/00

See application file for complete search history.

(56) References Cited

U.S. PATENT DOCUMENTS 5,569,508 A * 10/1996 Cundiff ................. B29C 44/186
                                                          244/133
5,921,754 A *  7/1999 Freitas .................. B29C 70/345
                                                          264/103

(Continued)

*Primary Examiner* — Jun Yoo
(74) *Attorney, Agent, or Firm* — Frost Brown Todd LLC

(57) ABSTRACT

A method of making a rub strip includes resin transfer molding an arcuate composite structure. The resin transfer molding step includes inserting a honeycomb core into a mold cavity having an arcuate base so that the honeycomb core assumes an arcuate shape. The resin transfer molding step further includes directing liquid resin into the mold cavity to form the composite structure comprising the liquid resin and the honeycomb core, and curing the liquid resin for a sufficient period of time. The resin transfer molding step further includes removing the composite structure from the mold. The method further includes repeating the resin transfer molding step until a sufficient number of arcuate composite structures are produced. The method further includes coupling a plurality of the arcuate composite structures together to form the rub strip.

17 Claims, 16 Drawing Sheets

(51) Int. Cl.
*F01D 5/28* (2006.01)
*F01D 11/00* (2006.01)
*B29C 45/36* (2006.01)
*B29K 63/00* (2006.01)
*B29K 705/02* (2006.01)
*B29L 31/00* (2006.01)
*B29L 7/00* (2006.01)

(52) U.S. Cl.
CPC . *B29L 2031/7504* (2013.01); *F05D 2300/431* (2013.01); *Y02T 50/672* (2013.01)

(56) References Cited

U.S. PATENT DOCUMENTS

| | | | |
|---|---|---|---|
| 7,060,156 B2 * | 6/2006 | Mack | B29C 70/24 |
| | | | 156/161 |
| 2006/0125155 A1 * | 6/2006 | Sekido | B29C 70/443 |
| | | | 264/511 |
| 2009/0162548 A1 * | 6/2009 | Kaspersion | B32B 3/12 |
| | | | 427/243 |
| 2010/0248573 A1 * | 9/2010 | Hascalovich | B29C 44/1209 |
| | | | 442/205 |
| 2015/0233262 A1 * | 8/2015 | Reed | F01D 21/045 |
| | | | 415/9 |
| 2015/0276223 A1 * | 10/2015 | Benson | F02C 7/24 |
| | | | 60/752 |

* cited by examiner

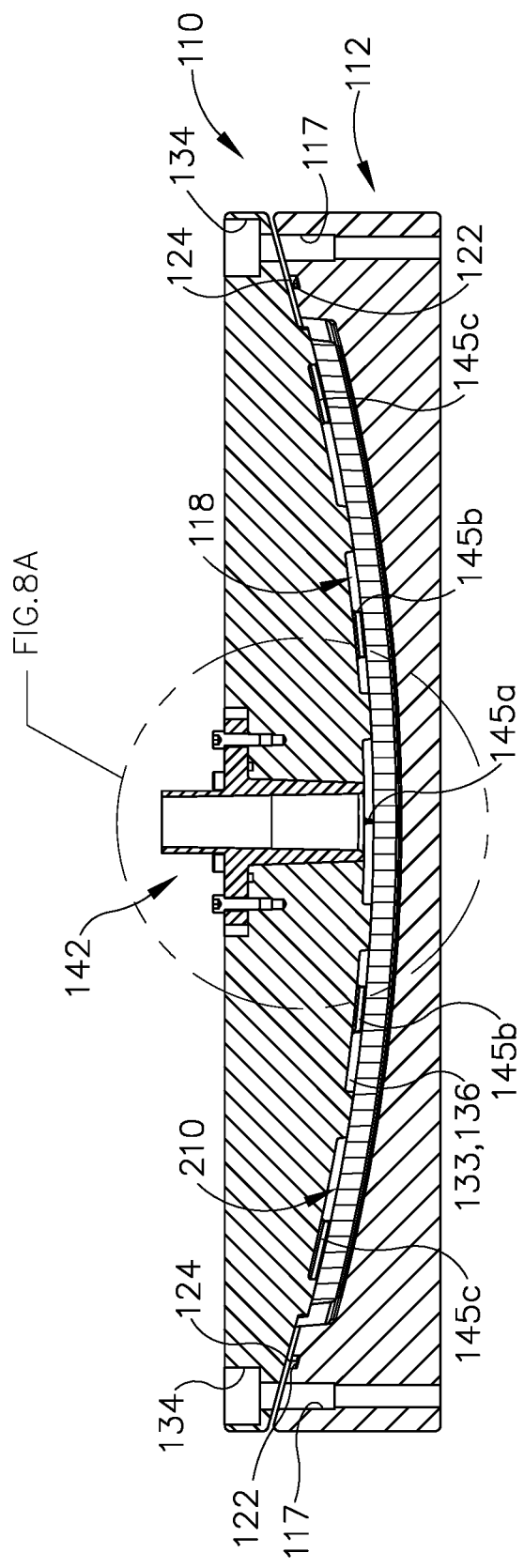

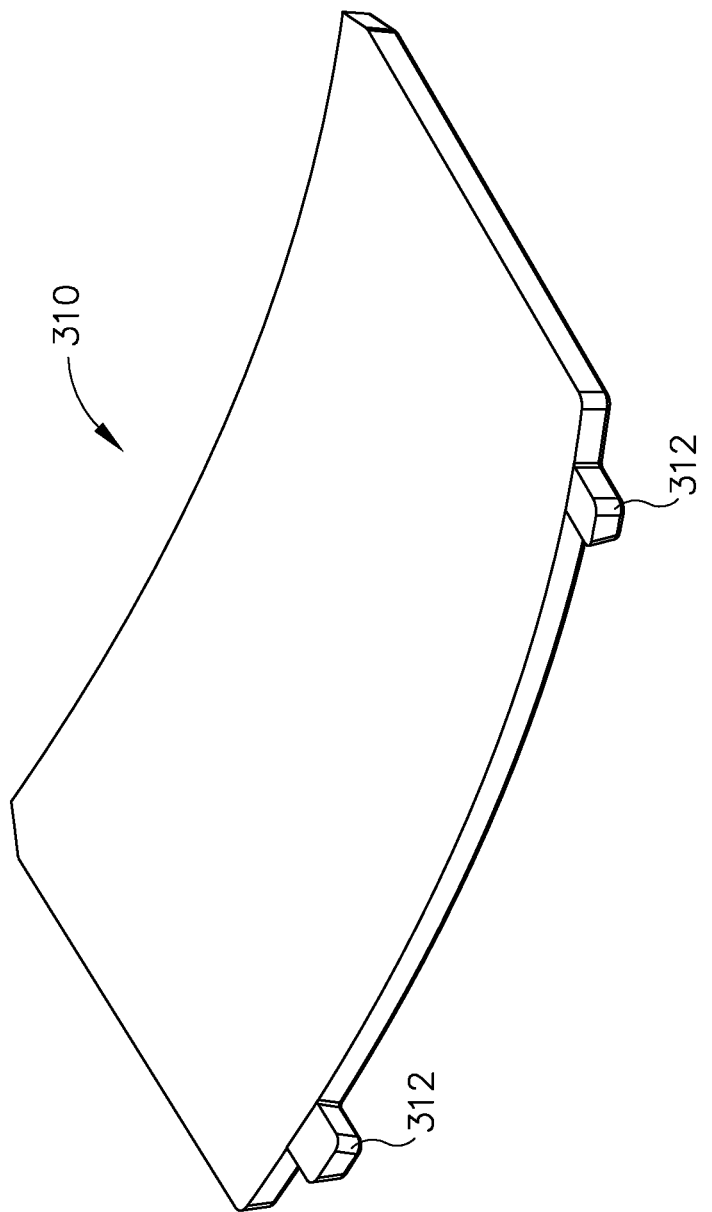

RESIN TRANSFER MOLDING PROCESS

PRIORITY

This application claims priority to Provisional Application No. 62/192,368, entitled "RESIN TRANSFER MOLDING PROCESS," filed Jul. 14, 2015, the disclosure of which is incorporated by reference herein in its entirety.

BACKGROUND

A rub strip is a structure placed on the inside of an engine casing that rotating turbine blades may contact when rotating off axis. Rub strips are configured to be damaged due to such contact by the turbine blades, with such damage providing an indication to mechanics and other personnel that the engine may not be functioning properly. Once damaged, however, rub strips may affect air flow within the turbine engine and must be removed upon being damaged. Conventional rub strip manufacturing is done by hand spreading, pressing, and troweling a resin into individual cells of a honeycomb core. Typical manufacturer recommended application of the resin or potting compound is done by a spatula or trowel. This current process is prone to result in a rub strip having a non-uniform surface finish and countless voids. Some of these issues are a product of human error; others are simply due to the properties of the materials used, the difficulties using them, and the shortcomings of the process. For example, the epoxy material used is thick and it is difficult to spread and trowel by hand to ensure that each cell of the honeycomb core is filled a sufficient amount, increasing the possibility of pockets of air being left within the cured epoxy. Because the honeycomb core is essentially a paper-like structure, it can be easily deformed during this application process, further resulting in distorted or broken honeycomb core cells, voids, or other defects. Moreover, due to the large size of the rub strip, the laborious nature of spreading the epoxy across the surface area of the core, and the material properties of the epoxy itself, some portions of the epoxy cure before portions which are later applied. Where uncured epoxy must be layered or added onto cured epoxy, voids and defects are very common due to the limited ability of a new layer of epoxy to bond to already-cured epoxy. It is therefore desirable to address these and other shortcomings of the fabrication of rub strips and of other composite parts.

BRIEF DESCRIPTION OF THE DRAWINGS

While the application concludes with claims which particularly point out and distinctly claim this technology, it is believed this technology will be better understood from the following description of certain examples taken in conjunction with the accompanying drawings, in which like reference numerals identify the same elements and in which:

FIG. 7B depicts a cross-sectional view, taken along line 7-7 of FIG. 2, showing the mold of FIG. 2 and the honeycomb core, peel ply fabric, and glass cloth of FIG. 7A.

FIG. 9 depicts a perspective view of honeycomb core and resin composite.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Figure 1:
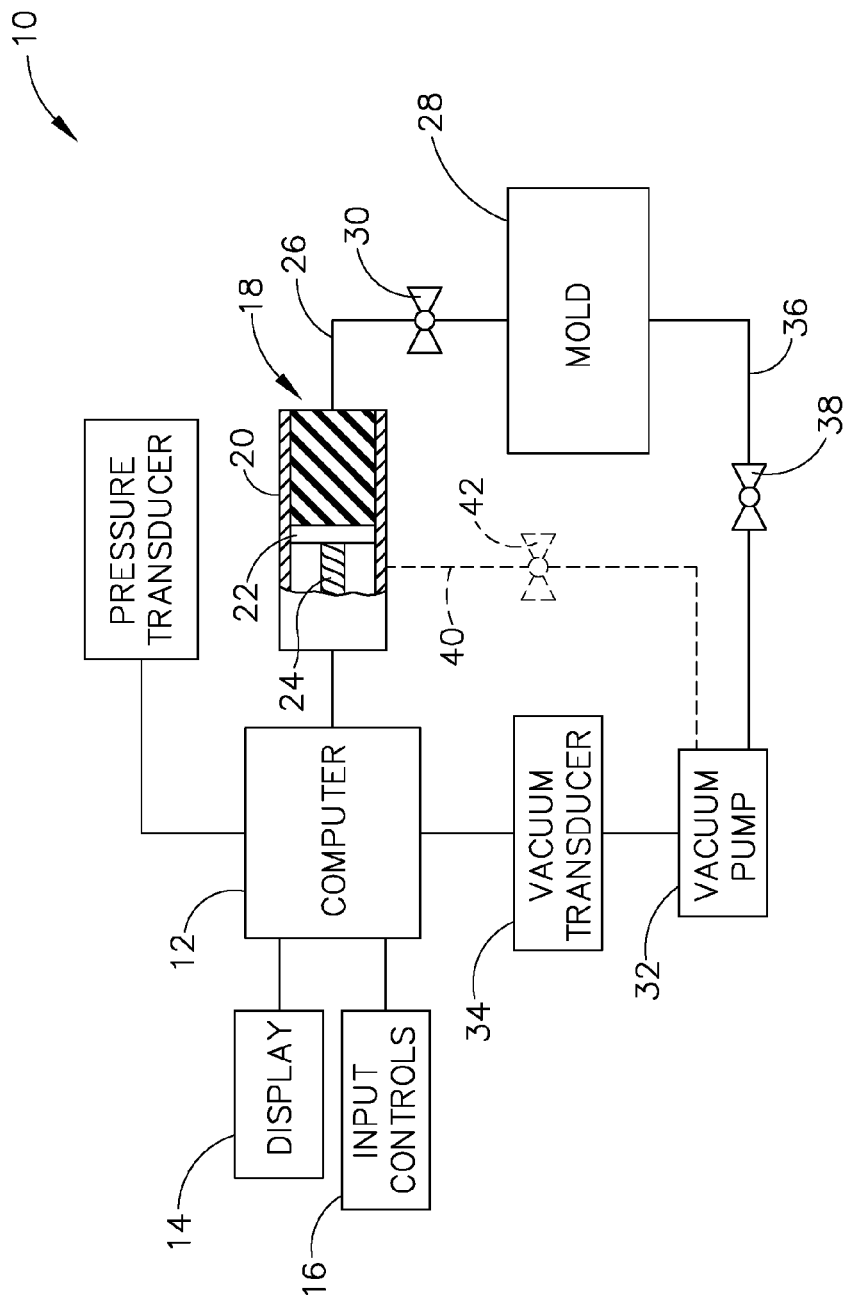
FIG. 1 depicts a schematic view of an example of a resin transfer molding system.
Figure 2:
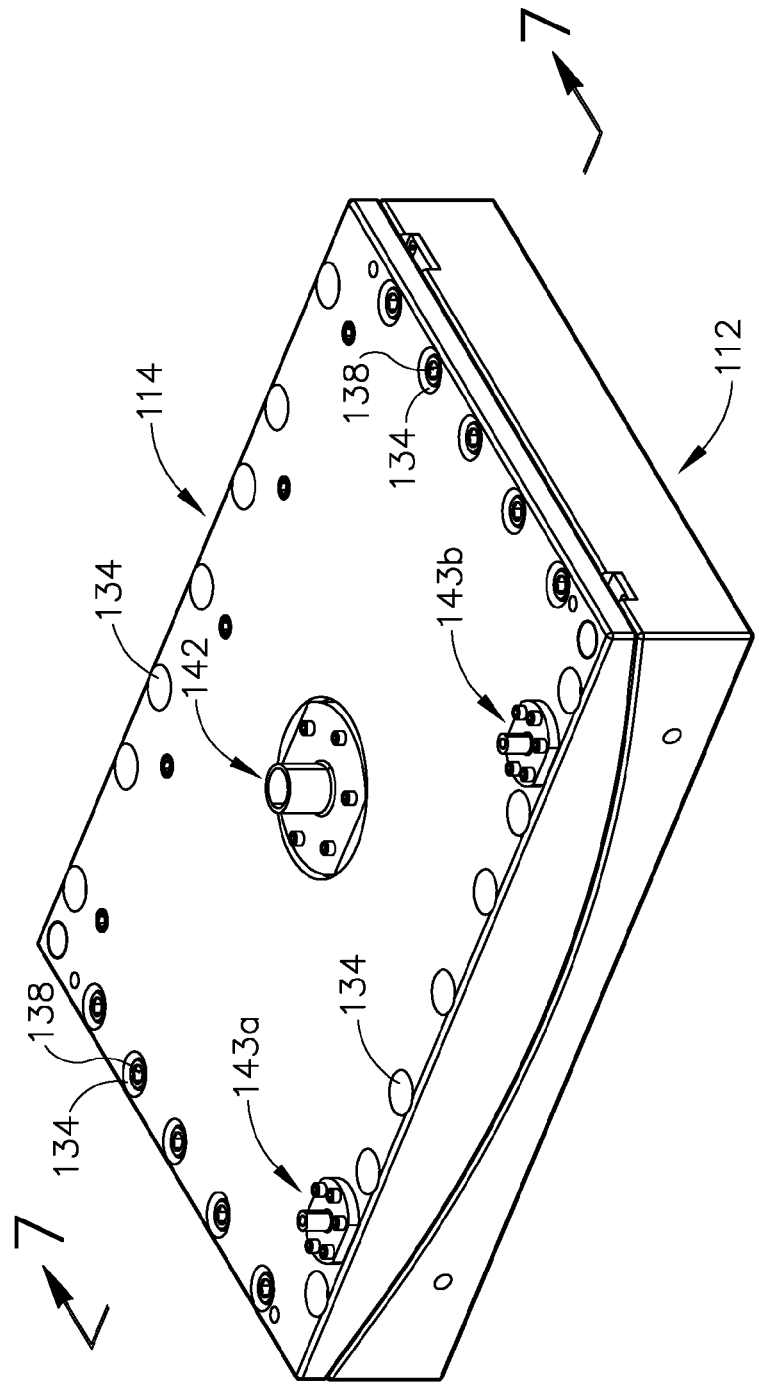
FIG. 2 depicts a perspective view of an exemplary mold of the system of FIG. 1.
Figure 3:
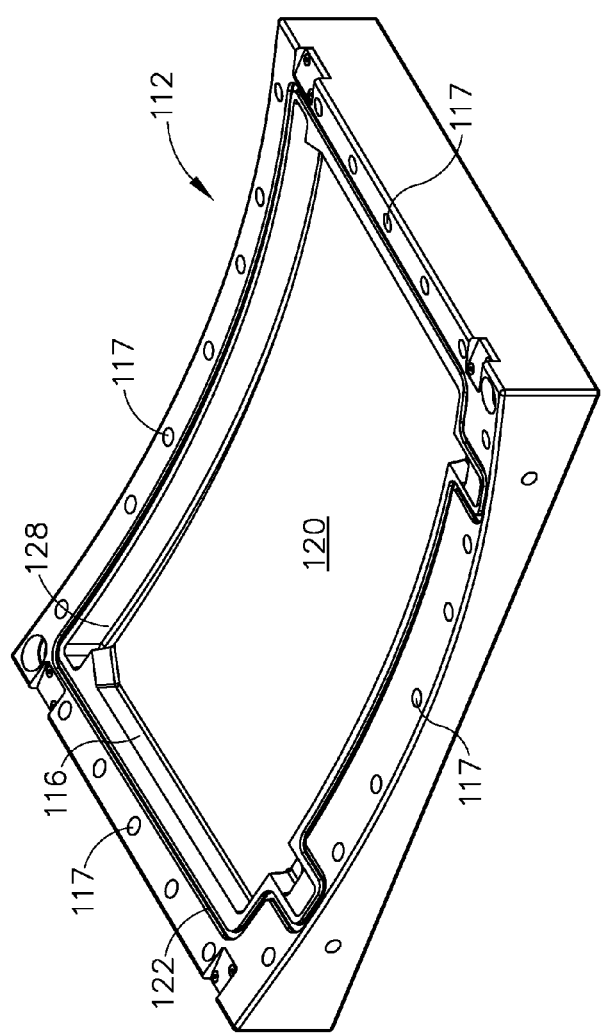
FIG. 3 depicts a perspective view of a base of the mold of FIG. 2.
Figure 4:
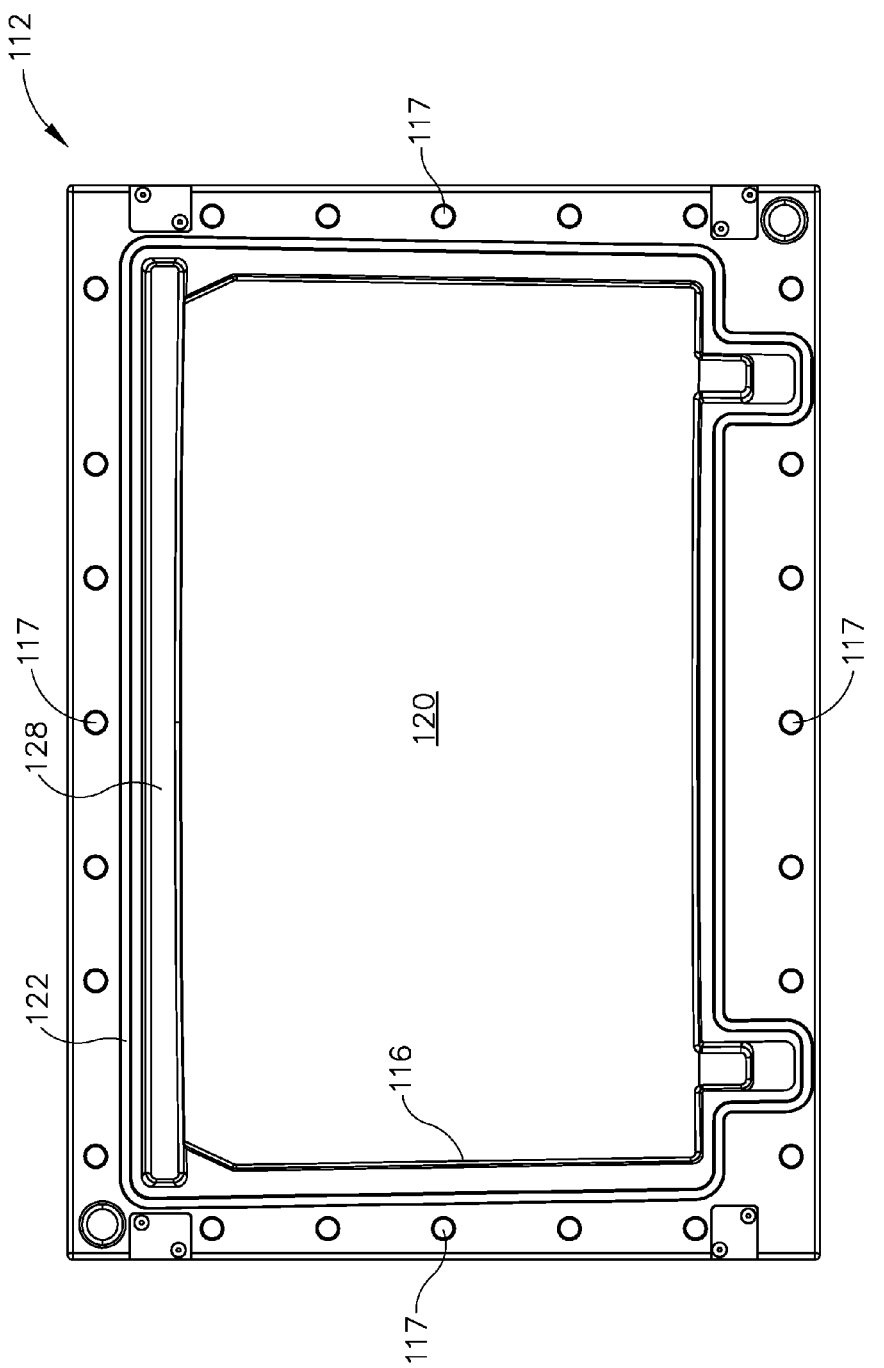
FIG. 4 depicts a top elevational view of a lid of the mold of FIG. 2.
Figure 5:
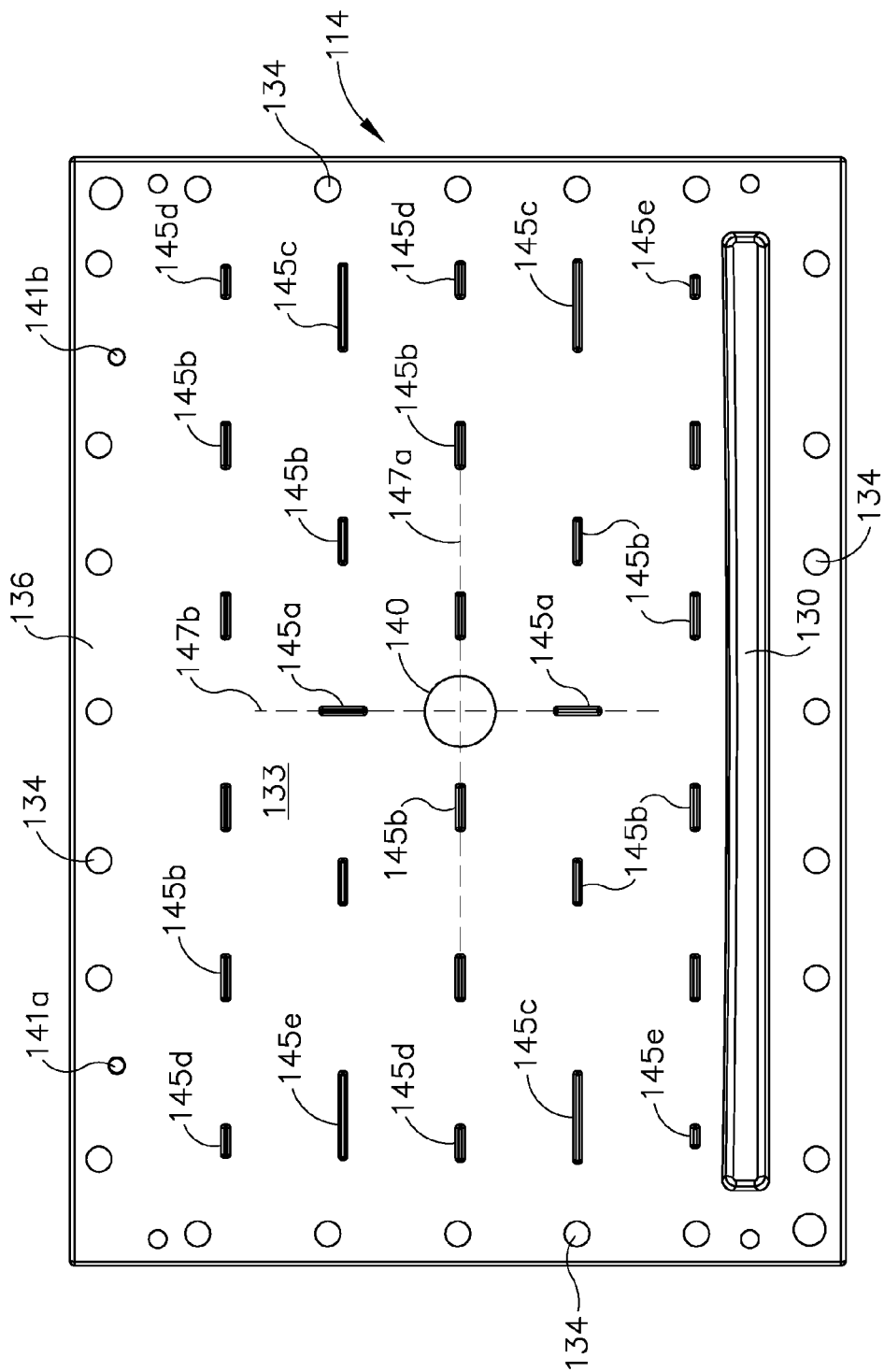
FIG. 5 depicts a bottom elevational view of the lid of the mold of FIG. 2.
Figure 6:
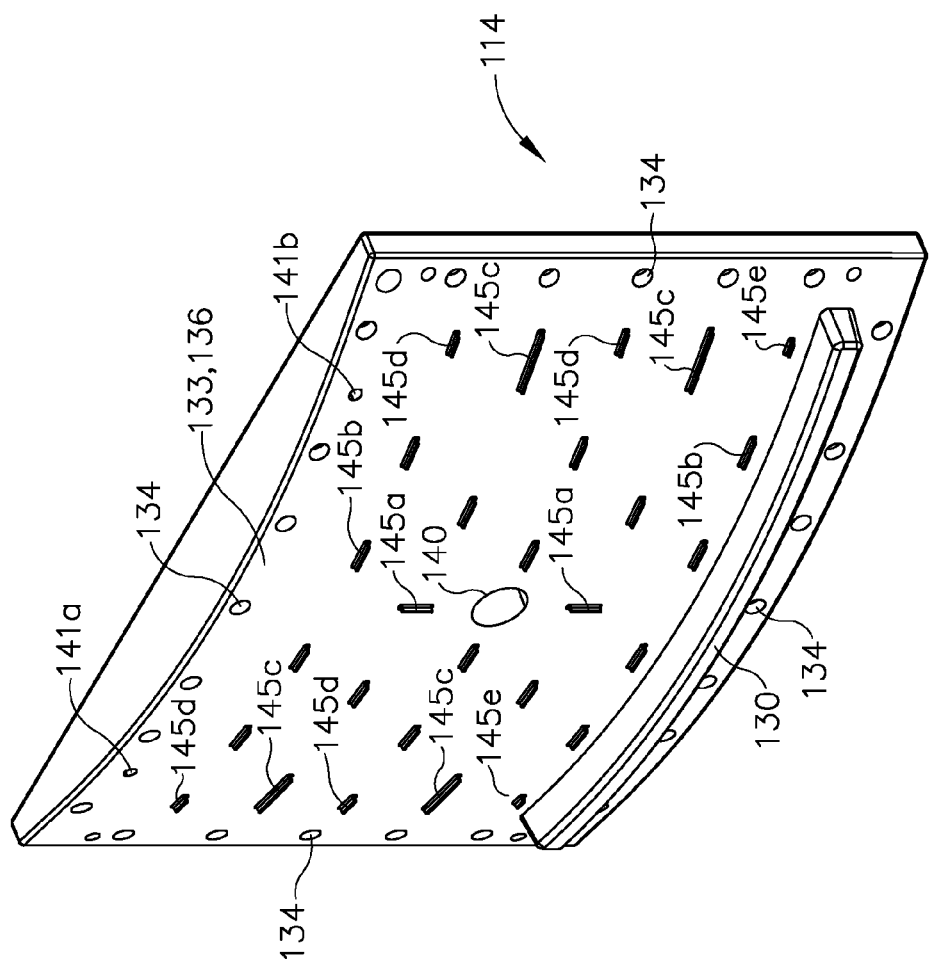
FIG. 6 depicts a perspective view of the lid of the mold of FIG. 2.
Figure 7A:
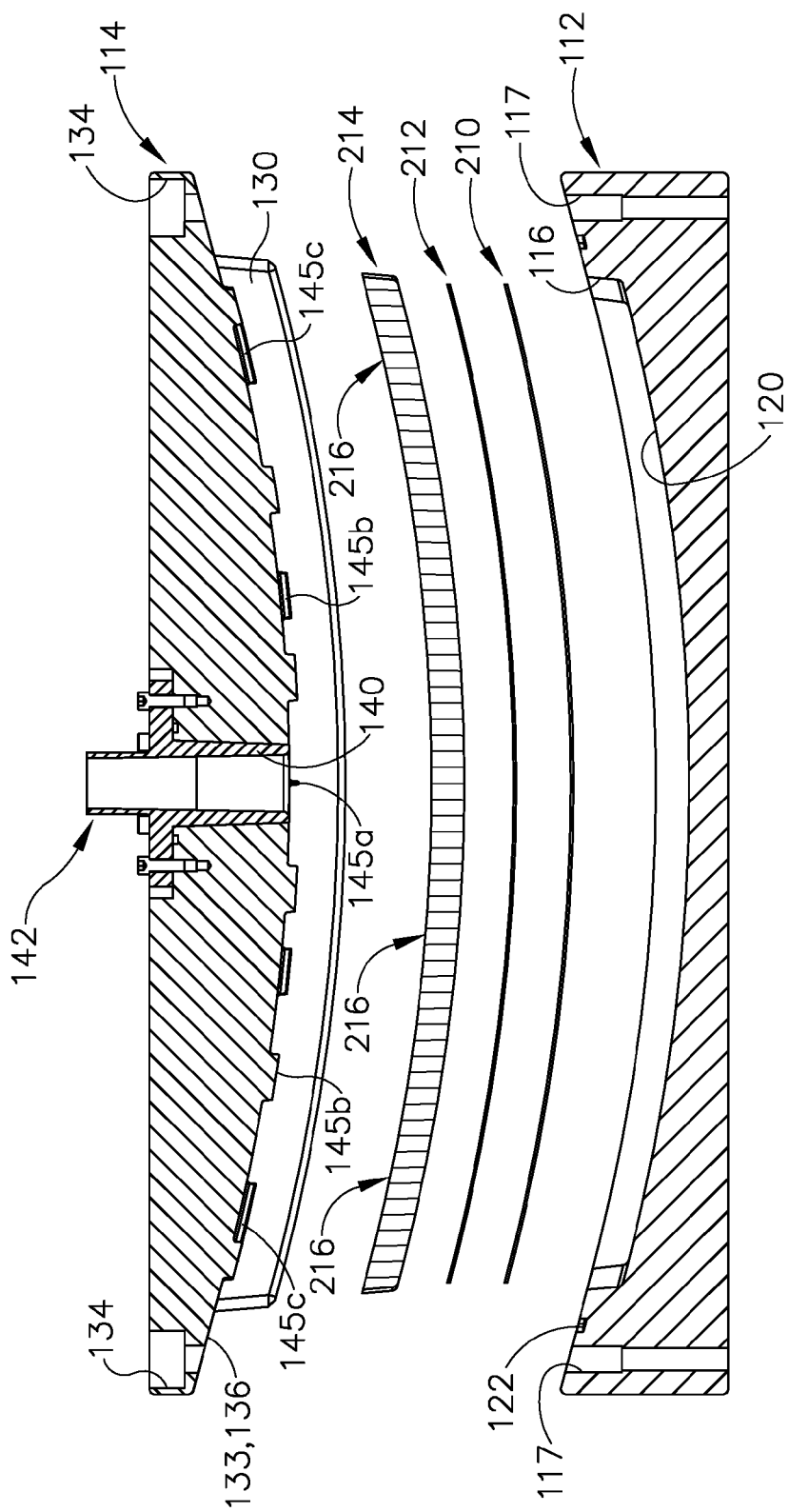
FIG. 7A depicts an exploded cross-sectional view, taken along line 7-7 of FIG. 2, showing the mold of FIG. 2, a honeycomb core, and layers of peel ply fabric and glass cloth.

The shortcomings of the current processes and methods of replacing portions of or entire rub strips of turbine engines are addressed by the disclosure herein which provides an automated process for manufacturing or replacing entire rub strips, or portions thereof, for turbine engine casings. While the disclosure discusses the manufacturing and assembly of rub strips for turbine engine casings, it will be understood that the process may be utilized for manufacturing rub strips suitable for use in other machines or devices, or for manufacturing composite structures and products other than rub strips. As described herein, rather than performing a process that results in voids and other defects, resin transfer molding processes and methods may be utilized in order to manufacture portions of rub strips. As discussed in further detail below, such portions may be for replacing entire rub strips or portions thereof. FIG. 1 depicts a schematic of an exemplary resin transfer molding system (10) that is suitable for manufacturing such components. As shown, the system (10) includes a computer (12) that is in communication with the other components of system (10) and that includes software configured to control the system (10). As shown, computer (12) includes a display (14). In the present example, computer (12) is configured to display information regarding the resin transfer molding process. In the example shown, computer includes input controls (16) (e.g., buttons) which may be used to control computer (12) and other portions of system (10). In other examples, computer (12) may include a keyboard, mouse, and other input components that will be apparent to persons skilled in the art in view of the teachings herein. System (10) includes an injection machine (18) that is suitable for a resin transfer molding process as described herein. As shown, injection machine (18) includes an injection cylinder (20) and a piston (22) connected to a linear actuator (24). Linear actuator (24) is configured to advance piston (22) linearly to force resin (15) from the injection cylinder (20). In other examples, however, piston (22) may be advanced in other manners, such as by a threaded advancement actuator. Other suitable configurations of injection machine (18) and manners of advancing piston (22) to inject resin (15) from injection machine (18) will be apparent to persons skilled in the art in view of the teachings herein.

System (10) includes a conduit (26) extending from injection machine (18) which may be connected to mold (28). Conduit (26) includes a valve (30) between injection machine (18) and mold (28) that may be opened to allow fluid communication between injection cylinder (20) and mold (28). Similarly, valve (30) may be closed in order to prevent fluid communication between injection cylinder (20) and mold (28). System (10) further includes a vacuum pump (32) and a vacuum transducer (34). Vacuum transducer (34) is in communication with computer (12) in order to display vacuum levels of vacuum pump (32) on computer (12). As shown, system includes a conduit (36) extending between vacuum pump (32) and mold (28). Conduit (36) includes a valve (38) that may be opened to allow fluid communication between vacuum pump (32) and mold (28). Similarly, valve (38) may be closed to prevent fluid communication between pump (32) and mold (28). In the example shown, when both valves (30, 38) are open, vacuum pump (32) may be fluidly communicated with both injection cylinder (20) and mold (28). Thus, when vacuum pump (32) is operated (e.g., via control by computer (12) and transducer (34)), a vacuum may be applied to both injection cylinder (20) and mold (28) to remove air from those components. In the example shown, however, an additional conduit (40) is provided and fluidly communicates vacuum pump (32) and injection cylinder (20). Conduit (40) includes a valve (42) which, when open, allows fluid communication between vacuum pump (32) and injection cylinder (20), and when closed, prevents fluid communication between vacuum pump (32) and injection cylinder (20). Accordingly, a vacuum can be applied only to injection cylinder (20), or only to mold (28), or to both of injection cylinder (20) and mold (28) by selectively opening and closing valves (30, 38, 42) during operation of vacuum pump (32). In the example shown, valves (30, 38, 42) are ball valves. In other examples, however, one or more of valves (30, 38, 42) may be other suitable types of valves that will be apparent to persons skilled in the art in view of the teachings herein. In the present example, valves (38, 40, 42) may be opened and closed manually. However, in other examples, one or more of valves (38, 40, 42) may be in communication with computer (12), for example, and may be opened or closed automatically in response to certain inputs or parameters received by computer (12). Other suitable manners of controlling valves (38, 40, 42) will be apparent to persons skilled in the art in view of the teachings herein.

Conduits (26, 36, 40) of the present example may be any suitable types of conduits. In the present example, conduits (36, 40) comprise piping with a flow path diameter of about ¼ inch and are made of suitable materials such as copper or nylon, or other suitable materials that are non-porous and rigid enough not to collapse under the required vacuum level(s) associated with the processes describe herein. In one example, conduit (26) comprises a diameter of about 1 inch and may be formed from schedule 40 and/or schedule 80 PVC. In any examples, conduits (26, 36, 40) may comprise any suitable materials and include fittings that are suitable to withstand pressures associated with a resin transfer molding process described herein.

FIGS. 2-8B shows an exemplary mold (110) that may be incorporated into a resin transfer molding system, such as system (10) described above. Accordingly, mold (110) may be incorporated into system (10) in place of mold (28). As shown, mold (110) includes a base (112) and a lid (114). Base (112) includes a generally rectangular shape. In the present example, base (112) includes a cavity portion (116) that, when lid (114) is placed on base (112), forms part of a mold cavity (118). In the present example, bottom surface (120) of cavity portion (116) is a curved surface including a radius that generally corresponds to the outer radius of a finished part that results from a resin transfer molding process using mold (110).

As shown, base (112) includes an O-ring channel (122) positioned outward of cavity portion (116) that is configured to receive an O-ring (124) (FIG. 7B). O-ring (124) includes a shape generally corresponding to the shape of channel (122) and provides a seal preventing fluid from entering into, or escaping from, mold cavity (118). Base (112) also includes a channel (128) adjacent to cavity portion (116) that receives a correspondingly shaped core insert portion (130) of lid (114), as described in further detail below.

In the present example, lid (114) includes a generally rectangular shape and is configured to be assembled to base (112) to form mold (110). Lid (114) includes an outer portion (132) having a plurality of apertures (134) which extend through lid (114) and which correspond to apertures (117) of base (112). Lid (114) also includes an inner portion (133) defining a curved surface (136) that extends concentrically relative to bottom surface (120) of base (112) when base (112) and lid (114) are assembled. As shown, lid (114) includes core insert portion (130) which is configured to be inserted into channel (128) in order to assemble base (112) and lid (114) together. Lid (114) and base (112) may thereby be assembled and fixedly coupled to one another by a plurality of fasteners (138), such as screws.

Lid (114) includes an opening (140) including a fitting (142) that is configured to be coupled to conduit (26) and injection machine (18) to thereby fluidly connect mold cavity (118) and injection machine (18). Fitting (142) may be any type of fitting that is suitable to connect to conduit (26) and that is configured to withstand the pressures and other parameters associated with the resin transfer molding process as described herein. In the example shown, opening (140) is in the center of lid (114). As shown, opening (140) and fitting (142) extend along an axis (139). Lid (114) further includes openings (141a, 141b) with corresponding fittings (143a, 143b) that enable cavity (118) to be fluidly communicated via conduits with a vacuum pump, such as via conduit (36) to vacuum pump (32). While lid (114) of the present example is shown to includes two openings (141a, 141b) with two corresponding fittings, lid (114) may include any suitable number of openings and fittings to be communicated with a vacuum pump with a corresponding number or configuration of conduits.

Inner portion (133) includes a plurality of projections (145a-e) extending therefrom. In the present example, and as discussed in further detail below, projections (145a-e) are configured to maintain the position of a core positioned within mold cavity (118) as resin (15) is being injected into the mold cavity (118). Moreover, projections (145a-e) are configured and positioned to direct the flow of fluid radially outwardly from opening (140) and evenly across mold cavity (118), as also discussed in further detail below. Projections (145a-e) extend from inner portion (133) such that the free ends of each projection, respectively, extend along a curved plane (217) (FIG. 8A) that is concentric to both the bottom surface (120) of base (112) and curved surface (136) of lid (114). In the example shown, projections (145a) extend perpendicular to a first axis (147a) extending through center of lid (114) and parallel (and coincident) to a second axis (147b) extending through center of lid (114). More particularly, the longitudinal axes of projections (145a) extend perpendicular to first axis (147a) and parallel (and coincident) to second axis (147b) extending through center of lid (114). As shown, projections (145b-e) extend parallel to first axis (147a) and perpendicular to axis (147b). In other examples, projections (145a-e) may be configured in a different manner. For example, the dimensions, orientations, and other characteristics of projections (145a-e) may be altered depending on the viscosity of the resin used, the material properties of core (214), and other factors that will be apparent to persons skilled in the art in view of the teachings herein.

System (10) may be utilized to make a resin transfer molded product or material. Particularly, system (10) may be utilized to make a composite material by inserting a core of material into mold (28, 110) and injecting a resin (15) into mold (28, 110). More particularly, system (10) incorporating mold (110), may be utilized to make a composite material, such as a composite material that may be used as a rub strip for use in aircraft engines. FIGS. 7A-8B and 11A-11B show particular steps of making a composite with a resin transfer molding process. It will be understood that the steps need not necessarily be performed in the order shown. Moreover, in some methods, some of the steps may be omitted or optional. Furthermore, other steps that may be performed in such a process or method will be apparent to persons skilled in the art in view of the teachings herein.

As shown, in order to make a composite material, a layer of glass fabric (210) including a shape that generally corresponds to the shape of cavity portion (116) is placed on bottom surface (120) as a vacuum breather path (block 402). Next, a layer of polyester release ply (also referred to as "peel ply fabric") (212), including a shape that generally corresponds to the shape of cavity portion (116), is placed on top of the glass fabric (210) (block 402). A material core (214) including a shape that generally corresponds to the shape of the cavity portion (116) may then be inserted into cavity portion on top of glass fabric (210) and peel ply fabric (212) (block 406). Glass fabric (210) and peel ply fabric (212) thereby will act as a barrier between bottom surface (120) of mold cavity (116) and the composite material after resin (15) has been injected into mold cavity (118). The outer surface, or bond surface of the composite material, may be improved due to the glass fabric (210) and peel ply fabric (212) when compared to conventional material application methods. Particularly, glass fabric (210) and peel ply fabric (212) act to separate the bonding surface of the composite part from mold release agents, and also to protect the bond surface from environmental contaminates during post-molding fabrication. In some examples, core (214) may be pretreated before being utilized in a resin transfer molding (RTM) process (404). For example, core (214) may be wiped with a clean cloth that is dampened with isopropyl alcohol. Core (214) may then be preheated in an air-circulating oven between about 190° F. and 210° F. for a minimum of about 2 hours. Then, core (214) may be cooled back to a temperature such as room temperature prior to being utilized in an RTM process. However, in other examples, core (214) may not be pretreated.

In the present example, core (214) comprises aramid fiber honeycomb coated with a heat resistant phenolic resin (e.g., NOMEX® manufactured by E.I. du Pont de Nemours and Company, Inc. (Wilmington, Del.)). In other examples, core (214) may be any material and configuration that is suitable for the intended application of the composite material. In other examples, core (214) may comprise paper honeycomb, aluminum honeycomb, titanium honeycomb, or other suitable materials and structures that will be apparent to persons skilled in the art in view of the teachings herein.

A user may then assemble mold (110) by placing lid (114) onto base (112), after placing O-ring (124) in channel (122) (block 408). In the present example, lid (114) and base (112) are essentially a clamshell structure such that lid (114) is placed on top of base (112). However, in other examples, mold (110) may be of different configurations such that it may be comprised of two components that are placed in apposition with and coupled to one another in a different manner than that shown. For example, rather than having lid (114) and base (112), where the lid (114) is placed on top of base (112), mold may comprise components that are placed in apposition side-by-side or in other configurations. Suitable other configurations that mold (110) may take will be apparent to persons skilled in the art in view of the teachings herein.

The user may then suitably fasten fasteners (115) such that base (112) and lid (114) are substantially immovably coupled to one another, and such that a seal is formed between base (112) and lid (114) at O-ring (124) (block 408). In the example shown, core (214) includes a thickness that generally corresponds to the distance between bottom surface (120) and plane (217) defined by the free ends of projections (145a-e), minus the combined thicknesses of the glass fabric (210) and poly ply (212). Due to such a thickness dimension of core (214), projections (145a-e) will contact core (214) and prevent movement of the core (214) during the resin injection process, but will not deform core (214) as lid (114) is assembled with base (112).

Once mold (110) is suitably assembled, mold (110) may be connected to vacuum pump (32) and injection machine (18) (blocks 410, 412). Injection machine (18) may also be connected to vacuum pump (32) (block 412). A two-part epoxy potting resin (15) may be mixed. In the present example, the resin (15) is mixed by hand for an amount of time that provides a suitable mixture (block 414). Once a suitable mixture is obtained, the resin (15) is then mixed using an electric mixer for an additional amount of time until the resin (15) is suitably mixed (block 416). In the present example, resin (15) comprises a mix ratio of 94 parts of the first part to 100 parts of the second part. However, other suitable mix ratios may be utilized depending on the materials selected. In the present example, resin (15) is an epoxy resin, but in other examples, resin (15) may comprise other suitable materials, such as polyurethanes or polyamide resins or any other resin(s) suitable for use in a rub strip or composite structure.

The mixed resin (15) is then loaded into injection cylinder (20) (block 418) and a vacuum is applied within injection cylinder (20) and to highly viscous liquid resin (15) (block 420). In the present example, a vacuum is applied by vacuum pump (32) to mold (110) via conduit (36) at a level reaching below approximately 6 Torr. In some examples, the vacuum may be applied at between approximately 1 Torr and approximately 6 Torr. Once a suitable vacuum has been applied to mold (110), a vacuum may be applied to resin (15) and injection cylinder (20) by opening valve (30), at a level of between approximately 1 Torr and approximately 6 Torr (block 422). In other examples, a vacuum may be provided to injection cylinder (20), additionally or alternatively, through conduits (26, 36) and through mold (110). Applying a vacuum to mold cavity (118) and injection cylinder (18) removes air entrapped within the resin (15), as well as reduces resistance to the flow of resin (15) into mold cavity (118).

After an acceptable level of vacuum has been reached within the mold cavity (118), such that the cavity (118) has been proven to be properly sealed to prevent voids in the composite material, the epoxy resin (15) is injected into mold cavity (118) (block 424). The injection parameters, such as resin pressure and flow rate, can be controlled using PC software on computer (12). The set points for injection pressure and flow rate are chosen such that the mold cavity (118) fills before the epoxy resin (15) begins to cure, but does not distort the core (214) within mold cavity (118). In the present example, such parameters are set such that resin (15) is initially injected into the mold at a pressure of between approximately 0 psi and approximately 300 psi and at a flow rate of approximately 0 cc/min and approximately 1000 cc/min.

As resin (15) flows into mold cavity (118), projections (145a-e) allow for resin (15) to flow in an advantageous flow path, radially outward from opening (140), such that the resin (15) disperses across the full top surface area of core (214). Without utilizing projections (145a-e) the flow of resin (15) can be more concentrated towards the center portions of core (214), resulting in individual cells (216) of core (214) being subjected to pressures that will cause distortion of such cells (216). In other words, cells (216) may become over-filled with resin (15) and may eventually rupture or otherwise be distorted without the proper dispersal of flow across core (214). The resin (15) is allowed to move across the top surface area of core (210) before high pressure is applied, which then pushes the resin (15) through the thickness of core (210) and to the bottom of the mold cavity (118).

Figure 8A:
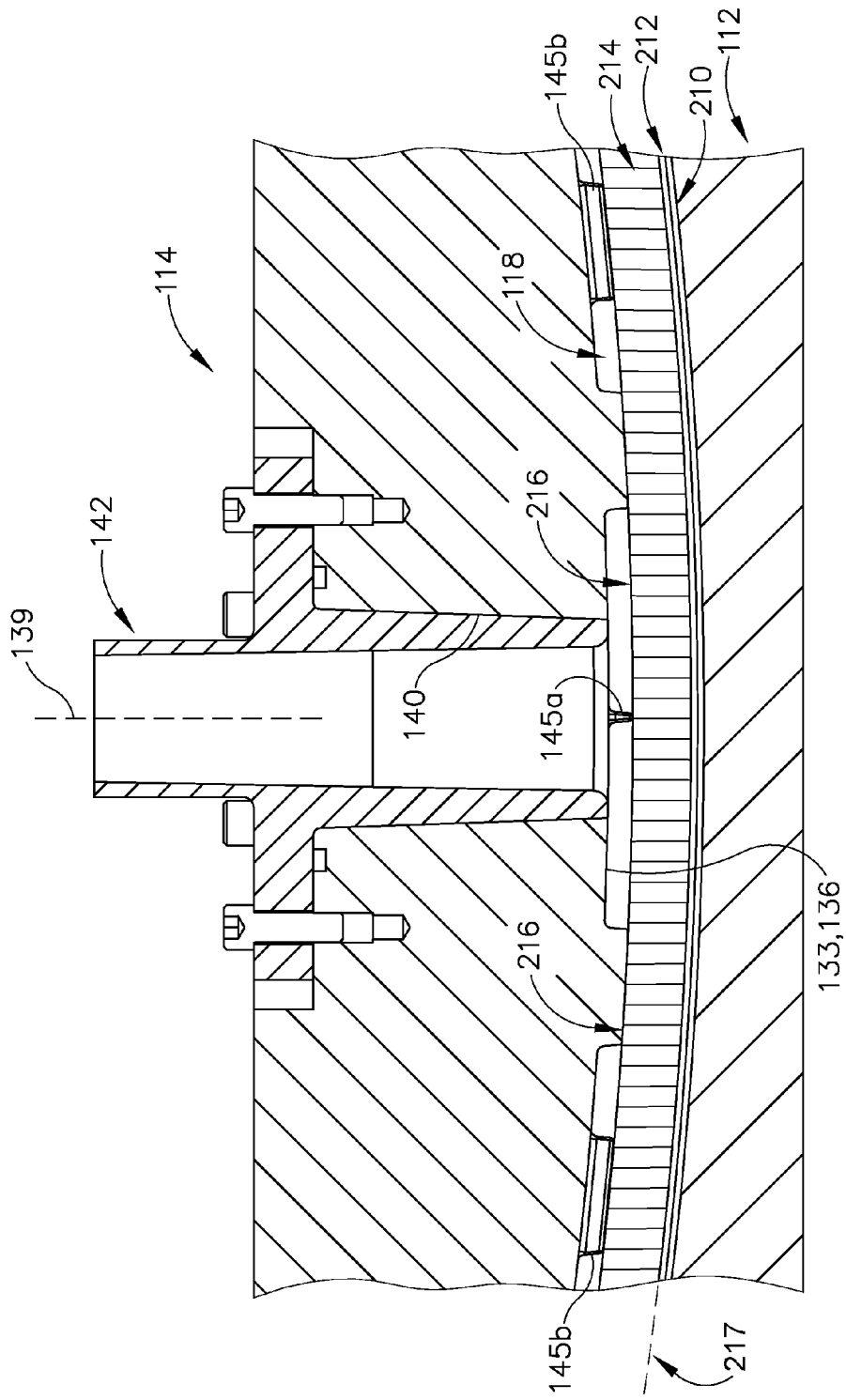
FIG. 8A depicts a detailed view of the mold, honeycomb core, and layers of peel ply fabric and glass cloth of FIG. 7A.
Figure 8B:
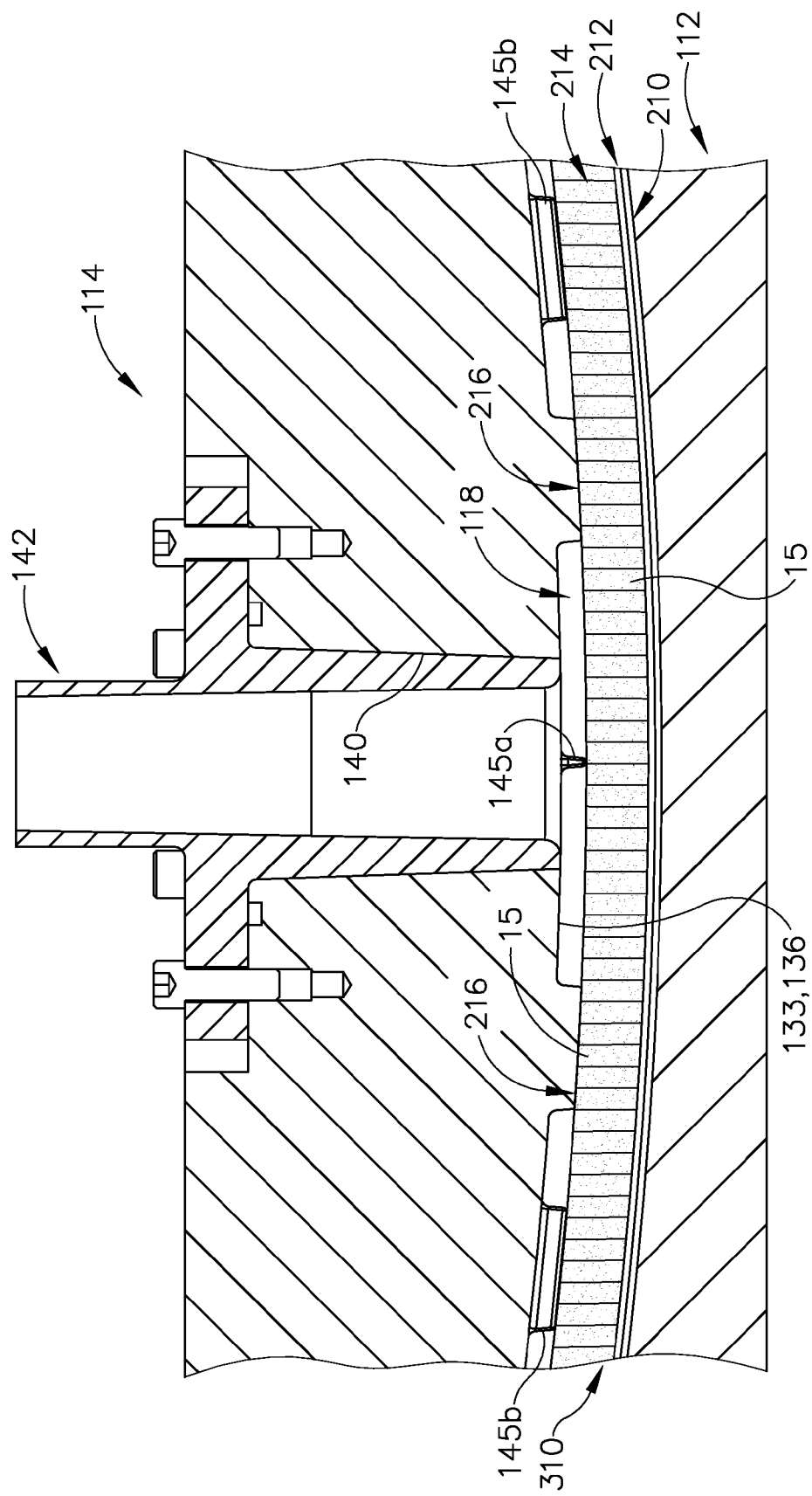
FIG. 8B depicts a detailed view of the mold, honeycomb core, and layers of peel ply fabric and glass cloth of FIG. 7A, showing resin having been injected into the mold.

As mold cavity (118) fills with resin (15), as shown in FIG. 8B, resistance to the resin (15) flow increases and the flow rate starts to decrease. Once mold cavity (118) has been filled with the epoxy resin (15), the flow rate drops toward approximately 0 cc/min. The vacuum ports are then closed (block 426). The injection port is left open and pressure continues to be applied to the resin (15) for an additional 10-15 minutes, or any other suitable time, to ensure voids within the mold cavity are filled (block 428) After that and while pressure is still applied, a ball valve is closed, sealing that pressure within the cavity while the resin (15) cures (block 430). With mold cavity (118) sealed at both the injection port (e.g., opening (140)/fitting (141)) and vacuum fittings (143a, 143b), mold (110) is disconnected from the injection machine (18) and the resin (15) left to cure (block 432). In some examples, the resin (15) is allowed to cure in the mold for at least 8 hours, such as a period for up to 24 hours, or a suitable time that allows for the resin to become fully cured and/or stiff enough to handle. In other examples, the resin (15) may be allowed to cure for a shorter time. Once the resin (15) cures for a suitable amount of time such that it is firm enough to handle without distorting the shape or otherwise damaging the composite part (310), composite part (310) may be removed from the mold (110) (block 434).

In some examples, after part (310) has been cured in mold (110), part (310) can be heated in an air-circulating oven between about 140° F. and about 160° F. for a minimum of about 60 minutes (block 436). In other examples, part (310) may be placed in an air-circulated oven or other heating device for less than about 60 minutes, or any other suitable time. The top or concave surface of the part (310) can then be machined such that the resin (15) is flush with the honeycomb core (block 440). If present, the injection port plug may be sanded flush to the concave surface of the part (block 440). The glass cloth (210) and peel ply (212) may then be removed (438), before or after the sanding or machining steps of particular portions of part.

A visual inspection of part (310) can then be performed to ensure that the part includes certain desirable or acceptable characteristics, such as an acceptable amount of separation between the honeycomb cells (216), an acceptable amount of distortion between the honeycomb cells (216), an acceptable amount of color distortion within the resin (15), and an acceptable amount of voids between the resin and the honeycomb core (block 442). The part (310) can then, in some methods, be oven dried in an air-circulating oven between about 190° F. and about 210° F. for a minimum of about 2 hours, or any other suitable time (block 444) according to the material used. However, in some methods, this additional heating/drying step may be optional.

Figure 10:
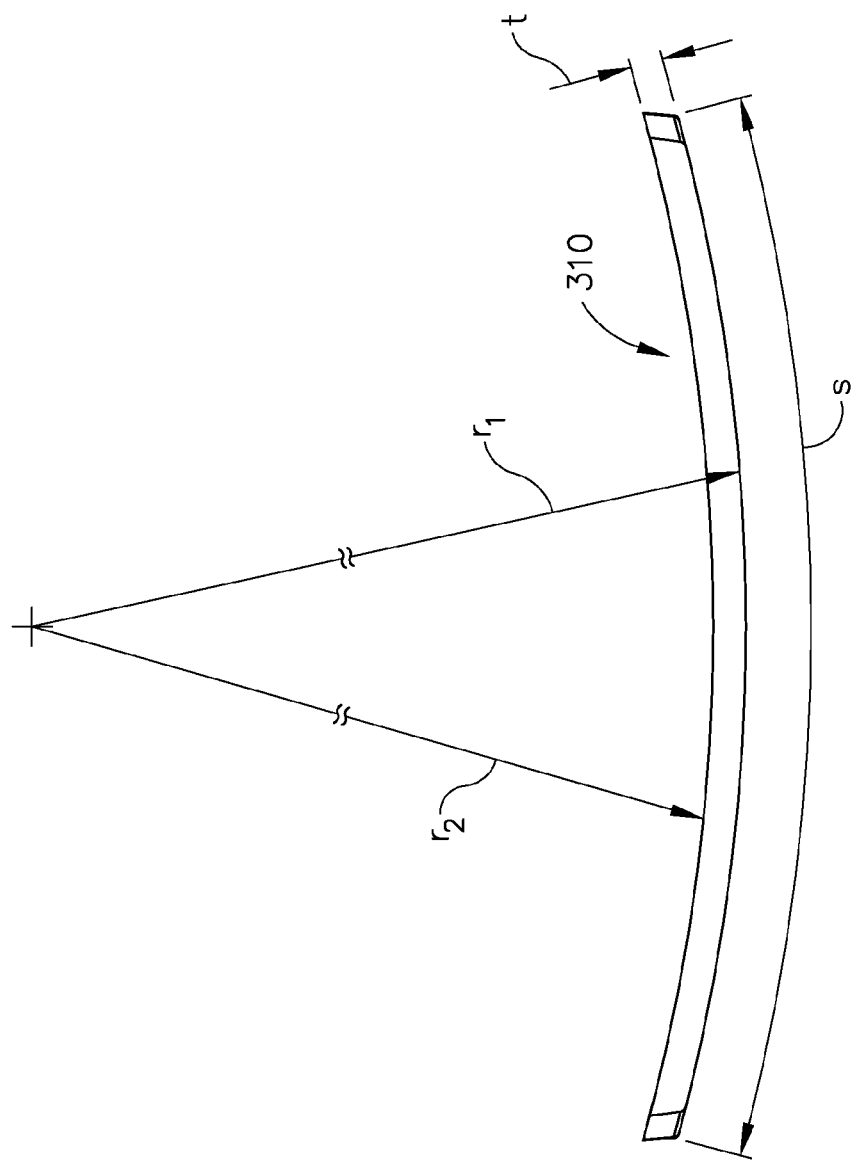
FIG. 10 depicts a side view of the honeycomb core and resin composite of FIG. 9.
Figure 11A:
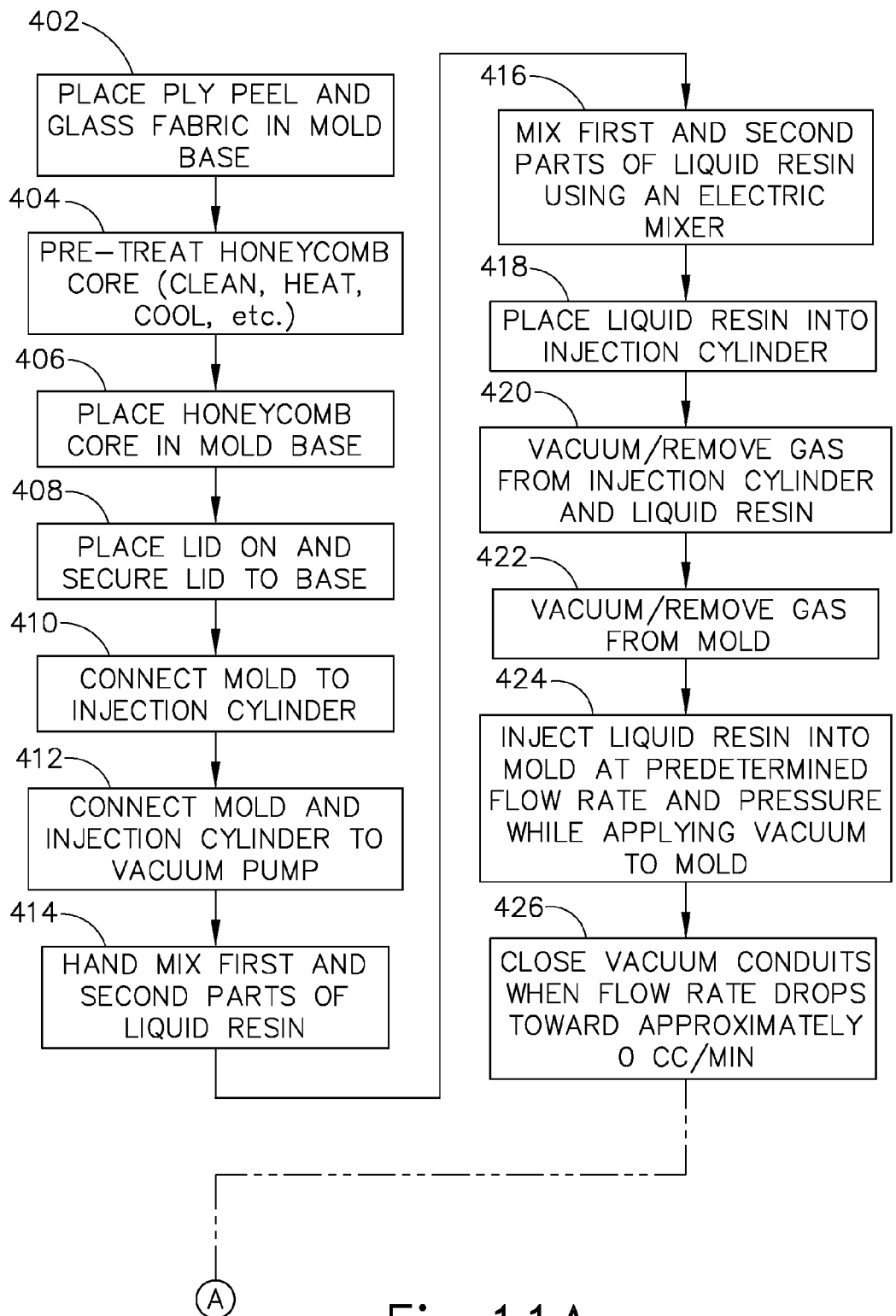
FIG. 11A is a flow chart depicting various steps for a method of resin transfer molding a composite.
Figure 11B:
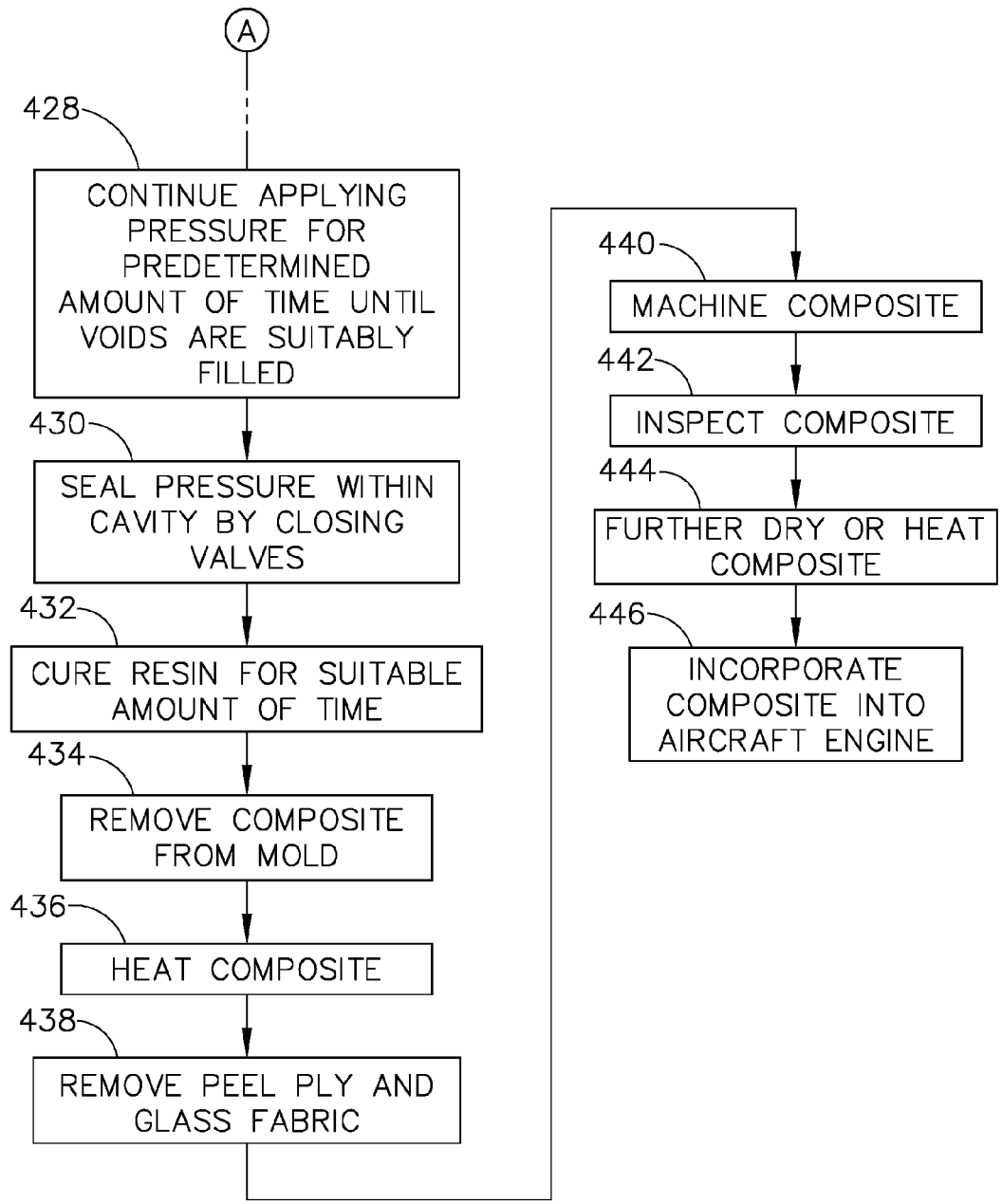
FIG. 11B is a flow chart depicting additional steps for the method of resin transfer molding a composite as shown in FIG. 11A.

FIG. 9 shows the composite part (310) after having been removed from mold (110) (and without the injection port plug). As described above, part (310) may be prepared for use as a portion of a rub strip. For example, part (310) may be machined further to, for example, remove tab-shaped portions (312) and any other portions that may be necessary. FIG. 10 shows a side view displaying part (310) after having been machined to a configuration that is appropriate for use as a portion of a rub strip. As shown, part (310) includes an outer radius r1 that allows it to be configured to be placed within an aircraft engine for use as a rub strip. In the example shown, part (310) includes an arc length (s) that corresponds to one-twelfth (1/12) of the circumference of an entire rub strip, but in other examples may make up a different portion of a rub strip. As shown, part (310) includes outer radius r1 and inner radius r2 (and thickness t), which in some examples r1 may be between approximately 80.5 inches and approximately 82 inches, r2 may be between approximately 79.7 and approximately 81.9. Similarly, t may be between approximately 0.1 inches and approximately 0.75 inches. In other examples, the values of r1, r2, and t will vary depending on the size of the turbine engine casing into which rub strip may be installed.

In other examples, mold (110) may be configured such that part resulting from an RTM process includes a different portion of a rub strip. For example, mold (110) may be configured such that part (310) makes up a smaller portion of rub strip (i.e., a smaller fraction thereof) such that more parts (310) are needed to complete a rub strip. Alternatively, mold (110) may be configured such that part (310) makes up a larger portion of rub strip (i.e., a greater fraction thereof) such that fewer parts (310) are needed to complete a rub strip. In other examples, mold (110) may be configured such that the resultant part is essentially a block of material that may be machined in order to accomplish the shape of part (310). For example, mold cavity (118) may include shapes other than the arcuate shape shown, such that the shape of the resultant part includes such a different shape. Suitable other configurations of mold (110) and the resulting part (310) will be apparent to persons skilled in the art in view of the teachings herein.

Figure 12:
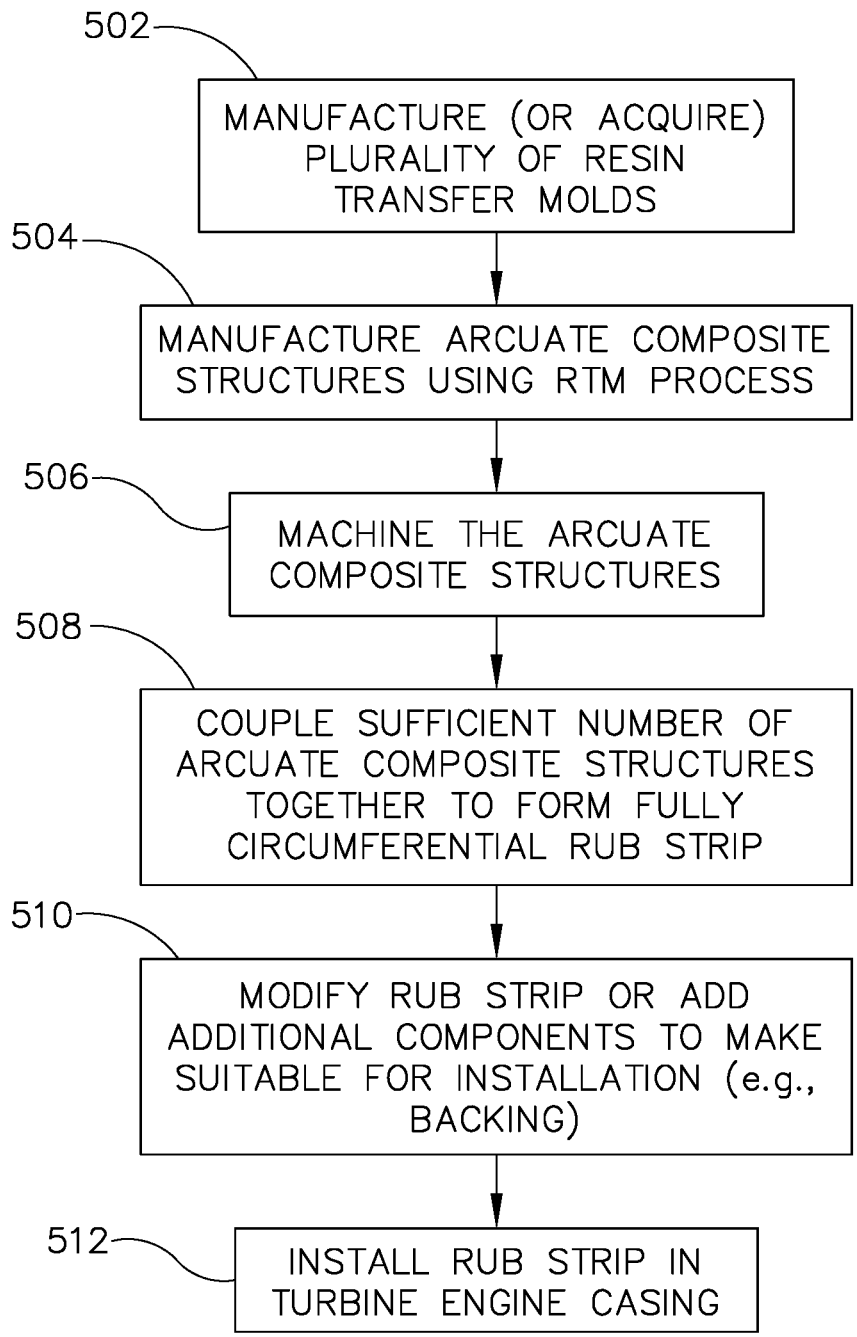
FIG. 12 is a flow chart depicting various steps of a method for manufacturing and replacing a rub strip of a turbine engine.

Therefore, it is possible to manufacture an entire rub strip, or portions of a rub strip, using the methods described herein. For example, FIG. 12 shows a method for making a rub strip for a turbine engine. It will be understood that the steps need not necessarily be performed in the order shown. Moreover, in some methods, some of the steps may be omitted or optional. Furthermore, other steps that may be performed in such a process or method will be apparent to persons skilled in the art in view of the teachings herein.

Figure 13:
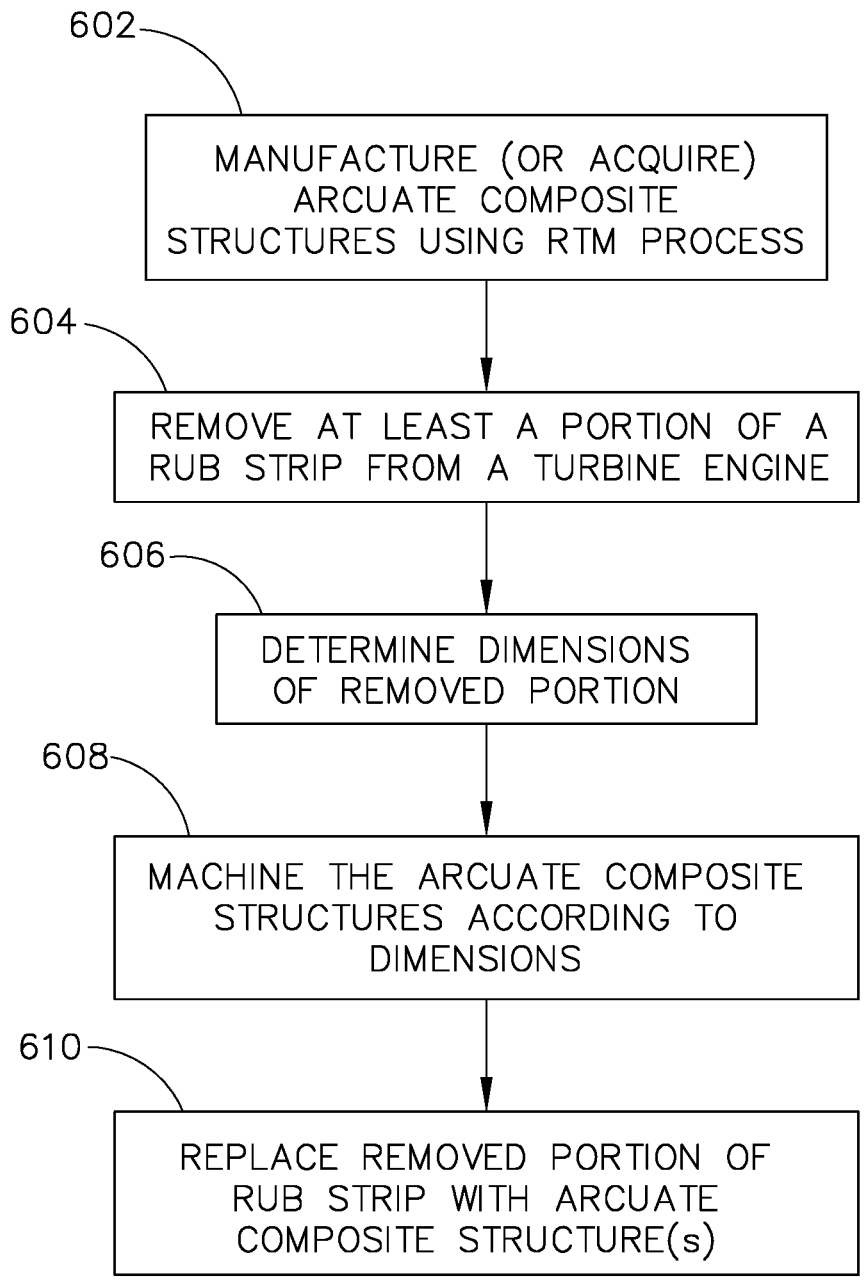
FIG. 13 is a flow chart depicting various steps of a method for replacing a portion of a rub strip of a turbine engine.

The method as shown in FIG. 12 includes manufacturing or acquiring a plurality of resin transfer molds and associated systems (injection machines (18), computer (12), etc.) (block 502). Such molds may be made in accordance with molds (28, 110) as described herein. Additionally or alternatively, other suitable molds may be manufactured or acquired. Using such molds (28, 110), arcuate composite structures, such as composite (310) may be manufactured using a RTM process (block 504), such as the processes described herein. The arcuate composite structures may be machined in accordance with the required specifications for a rub strip, and to remove flash and other unnecessary components. Such machining step described in block (506) may take place in accordance with other steps described herein. Once a sufficient number of arcuate composite structures are obtained or manufactured, they may be assembled together in order to make a fully circumferential rub strip (block 508). The rub strip may then be modified, further machined, or additional components added in order to make rub strip suitable for installation into an engine casing of a turbine engine (block 510), after which rub strip may be installed in a turbine engine casing (510). In some instances, it may be necessary to remove a prior used rub strip from the engine casing, in a similar manner described with respect to the method shown in FIG. 13.

In some situations, it may be necessary to replace only a portion of a rub strip rather than to replace or install an entire rub strip. In such situations, a portion of an existing rub strip may be removed (block 604) and arcuate composite structures, such as composite (310) may be manufactured using a RTM process (block 602), such as the processes described herein. Similarly, arcuate composite structures may simply be acquired rather than manufactured. Once the portion of the rub strip has been removed according to block (604), the dimensions, shape, and other characteristics of the removed portion may be determined. The arcuate composite structures may be machined in accordance with the required determined dimensions, shape and other specifications for the removed portion, and to remove flash and other unnecessary components (block 608). Such machining step described in block (506) may take place in accordance with other steps described herein. The arcuate composite structure may then be installed with the existing rub strip in place of the removed portion. It will be understood that the steps need not necessarily be performed in the order shown in FIG. 13. Moreover, in some methods, some of the steps may be omitted or optional. Furthermore, other steps that may be performed in such a process or method will be apparent to persons skilled in the art in view of the teachings herein.

Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

EXAMPLE 1

A method of making a rub strip, comprising: (a) resin transfer molding an arcuate composite structure, wherein the resin transfer molding step comprises: (i) inserting a honeycomb core into a mold cavity having an arcuate base so that the honeycomb core assumes an arcuate shape, (ii) directing liquid resin into the mold cavity to form the composite structure comprising the liquid resin and the honeycomb core, (iii) curing the liquid resin, and (iv) removing the composite structure from the mold; (b) repeating the resin transfer molding step until a sufficient number of arcuate composite structures are produced; and (c) assembling a plurality of the arcuate composite structures together to form the rub strip.

EXAMPLE 2

The method of Example 1, further comprising machining the arcuate composite structures prior to the assembling step.

EXAMPLE 3

The method of any one or more of Examples 1 through 2, further comprising installing the rub strip in an engine casing.

EXAMPLE 4

The method of any one or more of Examples 1 through 3, wherein the step of assembling a plurality of arcuate composite structures together comprises assembling twelve arcuate composite structures together to form a fully circumferential rub strip.

EXAMPLE 5

The method of any one or more of Examples 1 through 4, further comprising manufacturing a plurality of molds configured to enable production of the arcuate composite structure.

EXAMPLE 6

The method of Example 5, wherein each of the molds comprises a lid, wherein the lid comprises a curved inner surface, wherein the curved inner surface is concentric to the arcuate base when the lid is in apposition with a base of the mold, wherein the lid and the base define a mold cavity therebetween.

EXAMPLE 7

The method of Example 6, wherein the lid comprises an opening for receiving the liquid resin, wherein the lid comprises a plurality of projections extending from the inner surface, wherein the plurality of projections are configured to maintain the position of the honeycomb core within the mold cavity as the liquid resin is being directed therein.

EXAMPLE 8

The method of Example 7, wherein the lid defines a first axis extending through a center of the opening along a top surface of the lid, wherein longitudinal axes of one set of the projections extend parallel to the first axis, wherein longitudinal axes of another set of the projections extend perpendicular to the first axis.

EXAMPLE 9

The method of any one or more of examples 6 through 8, wherein each of the projections comprises a free end, wherein the free ends extend along a curved plane, wherein the curved plane is substantially concentric to the arcuate base.

EXAMPLE 10

The method of Example 9, wherein a radius of the curved plane defines an inner radius of the fully circumferential rub strip.

EXAMPLE 11

The method of any one of Examples 6 through 10, wherein the inner surface is substantially concentric to the arcuate base.

EXAMPLE 12

The method of any one of Examples 1 through 11, further comprising assembling a backing to the outer surface of the fully circumferential rub strip for installation in an engine casing.

EXAMPLE 13

The method of any one of Examples 1 through 12, further comprising inspecting the arcuate composite structures for voids.

EXAMPLE 14

The method of any one of Examples 1 through 13, wherein the step of resin transfer molding further comprises placing at least one layer of material in the arcuate base prior to inserting the honeycomb core, wherein the at least one layer of material is configured to aid in removal of the arcuate composite part from the mold.

EXAMPLE 15

The method of Example 14, wherein the at least one layer of material comprises glass fabric and/or peel ply fabric.

EXAMPLE 16

A method of making a rub strip for a turbine engine, comprising: (a) resin transfer molding a composite structure, wherein the resin transfer molding step comprises: (i) inserting a honeycomb core into a mold cavity, (ii) directing liquid resin into the mold cavity to form the composite structure comprising the liquid resin and the honeycomb core, (iii) curing the liquid resin, and (iv) removing the composite structure from the mold; (b) repeating the resin transfer molding step until a sufficient number of composite structures are produced; (c) machining the composite structures in order that the composite structures assume a shape of a portion of the rub strip; and (d) assembling the composite structures together to form the rub strip.

EXAMPLE 17

A method of resin transfer molding a composite part using a mold, a core of material including a honeycomb structure having a plurality of cells, and liquid resin, wherein the mold comprises a base and a lid, wherein the base and the lid define a mold cavity therebetween when the lid is positioned in apposition with the base, wherein the lid comprises an opening configured to be fluidly connected to a source of liquid resin, wherein the opening defines a central axis extending therethrough, wherein the lid comprises an inner surface and a plurality of projections extending away from the inner surface, the method comprising: (a) placing the core in the base; (b) positioning the lid in apposition with the base to thereby define the mold cavity; and (c) injecting the liquid resin into the mold cavity at a pressure and a flow rate such that the cells of the honeycomb structure are prevented from rupturing, wherein the projections maintain the position of the core within the mold cavity as the liquid resin is being directed therein.

EXAMPLE 18

The method of Example 17, wherein the flow rate comprises between approximately 0 cc/min and approximately 1000 cc/min.

EXAMPLE 19

The method of any one of Examples 17 through 18, wherein the pressure comprises between approximately 0 psi and approximately 300 psi.

EXAMPLE 20

The method of any one of Examples 17 through 19, wherein the honeycomb structure comprises aramid fiber, aluminum, or titanium.

Having shown and described various embodiments of the present invention, further adaptations of the methods and systems described herein may be accomplished by appropriate modifications by one of ordinary skill in the art without departing from the scope of the present invention.

Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A method of making a rub strip, comprising:
   (a) resin transfer molding a composite structure, wherein the resin transfer molding step comprises:
       (i) inserting a honeycomb core comprising honeycomb cells into a mold cavity of a mold, wherein the shape of the honeycomb core corresponds to the shape of the mold cavity,
       (ii) applying vacuum to a top surface of the mold cavity through a lid of the mold on opposing sides of an injection port,
       (iii) directing liquid resin into the mold cavity through the injection port to form the composite structure comprising the liquid resin contained within the honeycomb cells, wherein the shape of the honeycomb core is not distorted when the liquid resin is directed into the mold cavity,
       (iv) curing the liquid resin, and
       (v) removing the composite structure from the mold;
   (b) repeating the resin transfer molding step until a sufficient number of composite structures are produced;
   (c) machining the composite structures in order that the composite structures assume a shape of a portion of the rub strip; and
   (d) assembling the composite structures together to form the rub strip.

2. The method of claim 1, further comprising installing the rub strip in an engine casing.

3. The method of claim 1, wherein the step of assembling the composite structures together comprises assembling twelve arcuate composite structures together to form a fully circumferential rub strip.

4. The method of claim 1, wherein the mold is configured to enable production of an arcuate composite structure.

5. The method of claim 1, wherein the lid comprises a curved inner surface, wherein the curved inner surface is concentric to an arcuate base of the mold when the lid is in apposition with the base of the mold, wherein the lid and the base define the mold cavity therebetween.

6. The method of claim 5, wherein the inner surface is substantially concentric to the arcuate base.

7. The method of claim 5, wherein the lid comprises an opening for receiving the liquid resin, wherein the lid comprises a plurality of projections, wherein the plurality of projections are configured to maintain the position of the honeycomb core within the mold cavity as the liquid resin is being directed therein.

8. The method of claim 7, wherein the lid defines a first axis extending through a center of the opening along a top surface of the lid, wherein longitudinal axes of one set of the projections extend parallel to the first axis, wherein longitudinal axes of another set of the projections extend perpendicular to the first axis.

9. The method of claim 7, wherein each of the projections comprises a free end, wherein the free ends extend along a curved plane, wherein the curved plane is substantially concentric to the arcuate base.

10. The method of claim 9, wherein a radius of the curved plane defines an inner radius of the fully circumferential rub strip.

11. The method of claim 1, further comprising inspecting the composite structures for voids.

12. The method of claim 1, wherein the step of resin transfer molding further comprises placing at least one layer of material in an arcuate base of the mold prior to inserting the honeycomb core, wherein the at least one layer of material is configured to aid in removal of the composite structure from the mold.

13. The method of claim 12, wherein the at least one layer of material comprises glass fabric and/or peel ply fabric.

14. A method of resin transfer molding a composite part using a mold, a core of material including a honeycomb structure having a plurality of cells, and liquid resin, wherein the mold comprises a base and a lid, wherein the base and the lid define a mold cavity therebetween when the lid is positioned in apposition with the base, wherein the lid comprises an opening configured to be fluidly connected to a source of liquid resin, wherein the opening defines a central axis extending therethrough, wherein the lid comprises an inner surface and a plurality of projections extending away from the inner surface, the method comprising:
    (a) placing the core in the base;
    (b) positioning the lid in apposition with the base to thereby define the mold cavity; and
    (c) injecting the liquid resin into the mold cavity and into the cells of the honeycomb structure at a pressure and a flow rate such that the cells of the honeycomb structure are prevented from rupturing, wherein the projections maintain the position of the core within the mold cavity as the liquid resin is being directed therein, wherein the projections comprise a first set of projections aligned along a first longitudinal axis and a second set of projections aligned along a second longitudinal axis offset from the first longitudinal axis such that the first and second set of projections are positioned to extend into the flow path of the liquid resin to direct the flow of the liquid resin within the mold cavity in a predetermined flow path radially outward across a surface of the core.

15. The method of claim 14, wherein the flow rate comprises between approximately 0 cc/min and approximately 1000 cc/min.

16. The method of claim 14, wherein the pressure comprises between approximately 0 psi and approximately 300 psi.

17. The method of claim 14, wherein the honeycomb structure comprises aramid fiber, aluminum, or titanium.

* * * * *